United States Patent
Kim

(10) Patent No.: US 12,057,579 B2
(45) Date of Patent: Aug. 6, 2024

(54) SECONDARY BATTERY CONTAINING AN ORGANIC POLYMER ELECTRODE ADDITIVE CAPABLE OF OXIDATION-REDUCTION REACTION

(71) Applicant: Jae Kwang Kim, Cheongju-si (KR)

(72) Inventor: Jae Kwang Kim, Cheongju-si (KR)

( * ) Notice: Subject to any disclaimer, the term of this patent is extended or adjusted under 35 U.S.C. 154(b) by 33 days.

(21) Appl. No.: 17/325,250

(22) Filed: May 20, 2021

(65) Prior Publication Data

US 2022/0320513 A1   Oct. 6, 2022

(30) Foreign Application Priority Data

Apr. 1, 2021 (KR) .......................... 10-2021-0042440

(51) Int. Cl.
*H01M 4/00* (2006.01)
*H01M 4/505* (2010.01)
(Continued)

(52) U.S. Cl.
CPC ........... *H01M 4/604* (2013.01); *H01M 4/505* (2013.01); *H01M 4/525* (2013.01); *H01M 4/625* (2013.01); *H01M 2004/028* (2013.01)

(58) Field of Classification Search
CPC ...... H01M 4/62; H01M 4/131; H01M 4/1391; H01M 4/0509; H01M 4/525; H01M 4/366; Y02E 60/10
See application file for complete search history.

(56) References Cited

FOREIGN PATENT DOCUMENTS

| | | | |
|---|---|---|---|
| CN | 107565186 A | * 1/2018 | ............ H01M 10/00 |
| JP | 2014232705 A | * 12/2014 | |

(Continued)

OTHER PUBLICATIONS

Ishii et al. Nonaqueous Electrolyte Secondary Battery, Dec. 2014, (Year: 2014).*

(Continued)

*Primary Examiner* — Cynthia H Kelly
*Assistant Examiner* — Monique M Wills
(74) *Attorney, Agent, or Firm* — Insight Law Group, PLLC; Seung Lee

(57) ABSTRACT

Inorganic-based lithium mixed electrode materials have a low charge transfer rate and thus have poor fast charging or discharging characteristics. Positive electrode active materials include LCO (lithium cobalt oxide, $LiCoO_2$), NCM (nickel cobalt manganese, $Li(NiCoMn)O_2$), NCA(nickel cobalt aluminum, $Li(NiCoAl)O_2$), LMO(lithium manganese oxide, $LiMn_2O_4$), LFP(Lithium iron phosphate, $LiFePO_4$), etc. High nickel technology is attracting attention because if nickel is used a lot, the capacity of lithium ions can be increased. However, as the content of nickel increases, the reactivity increases, resulting in a risk of explosion of the battery and deterioration in cycle life characteristics. As the negative active material, carbon, transition metal oxide, nickel metal, silicon-nickel alloy, and the like may be used. As the carbon, natural graphite, artificial graphite, soft carbon, hard carbon, etc. can be used. As the transition metal oxide, $Co_3O_4$, CoO, FeO, NiO, and the like can be used. The present invention adds a polymer additive containing free radicals in the molecular structure to the electrode to solve the problems of the existing secondary battery. The polymer additive contains free radicals and undergoes an oxidation-reduction reaction through ionic interactions. When this polymer additive is included in the electrode, the fast charging and fast discharging characteristics are improved, and the stability of the electrode is improved. When the stability of the electrode is improved, the cycle life characteristics of the electrode are improved. Because the polymer additive participates in the electrochemical reaction, it increases the practical capacity of nickel. When dissolved in a solvent, the polymer additive can increase the viscosity and act as a binder.

11 Claims, 14 Drawing Sheets inorganic electrode material carbon conductive material binder organic polymer electrode additive

(51) Int. Cl.
  *H01M 4/525* (2010.01)
  *H01M 4/60* (2006.01)
  *H01M 4/62* (2006.01)
  *H01M 4/02* (2006.01)

(56) References Cited

FOREIGN PATENT DOCUMENTS

| JP | 2015103471 A | * | 6/2015 | |
| JP | 2021061231 A | * | 4/2021 | ........... Y02E 620/10 |
| KR | 10-2018-0134615 A | | 12/2018 | |
| WO | WO-2015148601 A1 | * | 10/2015 | ........ H01M 10/0525 |

OTHER PUBLICATIONS

Harada Masanori, Manufacturing Method of Power Storage Device and Power Storage Device, Jun. 2015. (Year: 2015).*

Yamaguchi et al., Negative Electrode Active Material Containing Si Phase and TiSi2 Phase, Apr. 2021, See the Abstract. (Year: 2021).*

Huang et al., Battery With Temperature Self-sensing Capability, Comprises Electrodes Having Pyroelectric Property Which Changes Voltage Of Battery With Internal Temperature and Enables Detection of Temperature Change, Jan. 2018, See the Abstract. (Year: 2018).*

Ji-Eun, L. et al. "Electrochemical Properties of Poly(Stryrenesulfonate)-Carbon Composite Anode for Organic Rechargeable Battery", Journal of the Korean Electrochemical Society, 2016. 10.09, vol. 19, No. 4, 129-133.

Juho H. et al. "Organic electrode materials with solid-state battery technology", Journal of Materials Chemistry A, 2019. 07.25. 7. 18735-18758.

Non-final Office Action mailed on May 23, 2023 from the Korean Patent Office for Korean Application No. 10-2021-0042440 and its English translation.

* cited by examiner inorganic electrode material carbon conductive material binder organic polymer electrode additive

SECONDARY BATTERY CONTAINING AN ORGANIC POLYMER ELECTRODE ADDITIVE CAPABLE OF OXIDATION-REDUCTION REACTION

CROSS-REFERENCE TO RELATED APPLICATION(S)

This application claims priority from Korean Patent Application No. 10-2021-0042440, filed on Apr. 1, 2021, in the Korean Intellectual Property Office, the disclosure of which is incorporated herein by reference in its entirety.

TECHNICAL FIELD

The present invention relates to a technology for manufacturing an electrode by adding an organic polymer electrode additive containing free radicals to an existing inorganic material-based electrode. The use of the electrode of the present invention can improve the electrochemical properties of a secondary battery. The organic polymer electrode additive of the present invention has free radicals. The organic polymer electrode additive of the present invention can increase the electrochemical reaction rate of a secondary battery because it undergoes an oxidation-reduction reaction through ionic interaction. The organic polymer electrode additive of the present invention can serve as a binder because it increases viscosity by dissolving in a solvent used for manufacturing an electrode. The organic polymer electrode additive of the present invention can be used for the positive electrode and the negative electrode. The organic polymer electrode additive used for the positive electrode undergoes an oxidation-reduction reaction at 3V~4V. The organic polymer electrode additive used for the negative electrode undergoes an oxidation-reduction reaction at 0V~2V. Because the organic polymer electrode additive of the present invention participates in an electrochemical reaction to store or release electrons, it can store ions such as sodium ion and lithium ion. Therefore, the organic polymer electrode additive of the present invention can increase the practical capacity of the secondary battery. The organic polymer electrode additive of the present invention has a stable structure. When the organic polymer electrode additive of the present invention is coated on an electrode active material, the stability of the electrode can be improved, thereby improving the cycle life characteristics of a secondary battery.

BACKGROUND ART

A conventional secondary battery electrode is made of an inorganic electrode material that undergoes an oxidation-reduction reaction, a conductive material for transferring electrons, and a binder that binds the inorganic electrode material and the conductive material. Of these, only inorganic electrode material participates in the electrochemical reaction. Alternatively, an inorganic electrode material having low electrical conductivity is coated with a conductive polymer to improve electrical conductivity, and then an electrode is made together with a conductive material and a binder. Carbon black, carbon nanotubes (CNT), etc. were used as the conductive material.

DISCLOSURE

Technical Problem

Inorganic-based lithium mixed electrode materials have a low charge transfer rate and thus have poor fast charging or discharging characteristics. Positive electrode active materials include LCO (lithium cobalt oxide, $LiCoO_2$), NCM (nickel cobalt manganese, $Li(NiCoMn)O_2$), NCA (nickel cobalt aluminum, $Li(NiCoAl)O_2$), LMO (lithium manganese oxide, $LiMn_2O_4$), LFP (Lithium iron phosphate, $LiFePO_4$), etc. High nickel technology is attracting attention because if nickel is used a lot, the capacity of lithium ions can be increased. However, as the content of nickel increases, the reactivity increases, resulting in a risk of explosion of the battery and deterioration in cycle life characteristics. As the negative active material, carbon, transition metal oxide, nickel metal, silicon-nickel alloy, and the like may be used. As the carbon, natural graphite, artificial graphite, soft carbon, hard carbon, etc. can be used. As the transition metal oxide, $Co_3O_4$, CoO, FeO, NiO, and the like can be used.

Technical Solution

The present invention adds a polymer additive containing free radicals in the molecular structure to the electrode to solve the problems of the existing secondary battery. The polymer additive contains free radicals and undergoes an oxidation-reduction reaction through ionic interactions. When this polymer additive is included in the electrode, the fast charging and fast discharging characteristics are improved, and the stability of the electrode is improved. When the stability of the electrode is improved, the cycle life characteristics of the electrode are improved. Because the polymer additive participates in the electrochemical reaction, it increases the practical capacity of nickel. When dissolved in a solvent, the polymer additive can increase the viscosity and act as a binder.

Advantageous Effects

The present invention increases the practical capacity of a secondary battery by including a polymer material containing free radicals in the electrode.
The present invention improves the fast charging and fast discharging characteristics of a secondary battery by including a polymer material containing free radicals in the electrode. The present invention improves the cycle life characteristics of a secondary battery by including a polymer material containing free radicals in the electrode.

MODES OF THE INVENTION

Figure 1:
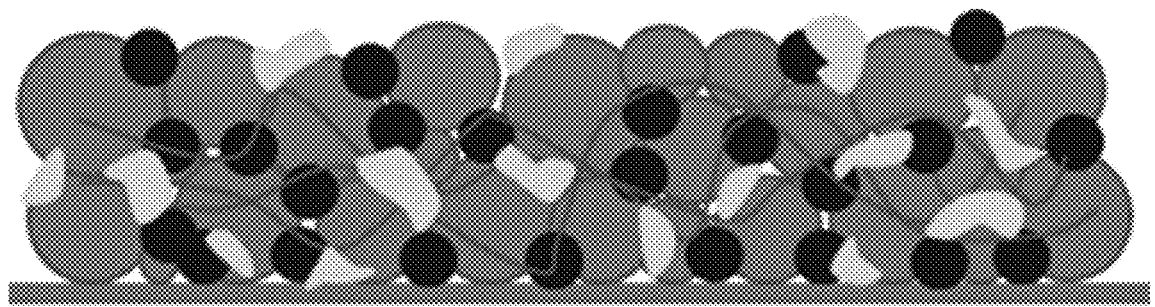
FIG. 1 is a figure showing the structure of an electrode containing the organic polymer additive containing free radicals of the present invention.
Figure 1:
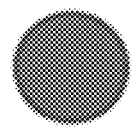
Figure 1:
Figure 1:
Figure 1:

An embodiment of the present invention will be described in more detail. The embodiments mentioned in this specification are presented only as examples. The present invention is not limited by the embodiments. The present invention is only defined by the claims which will be described later.

Representative materials that have free radicals in the molecular structure of the polymer and can undergo an electrochemical oxidation-reduction reaction through ionic interactions include polymers with nitroxide radicals, polymers with sulfonyloxy radicals, polymers with phenoxyl radicals, and the like.

The polymers with nitroxide radicals include a substance containing a tempo group of chemical formula 1, a substance containing a proxyl group of chemical formula 2, a substance containing a 1,1,3,3-tetramethyl-isoindoline-2-yloxyl group of chemical formula 3, and a substance containing N-tert-butyl-N-oxylamino phenyl group of chemical formula 4.

[chemical formula 1]

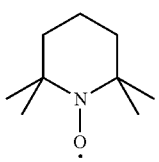

[chemical formula 2]

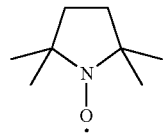

[chemical formula 3]

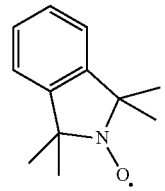

[chemical formula 4]

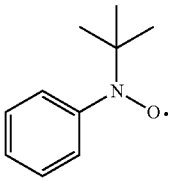

Specific examples of the polymers with nitroxide radicals include PTMA of chemical formula 5, poly(2,2,6,6-tetramethylpiperidinyloxy-4-ylmethacrylate, PTVE of chemical formula 6, poly(2,2,6,6-tetramethylpiperidine-4-yl-1-oxyl vinyl ether, PTNB of chemical formula 7, poly[2,3-bis(2,2,6,6-tetramethylpiperidine-N-oxycarbonyl)-norbornene.

[chemical formula 5]

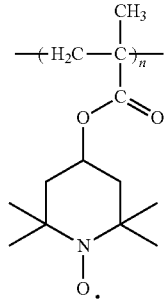

(n is 5 to 1000)

[chemical formula 6]

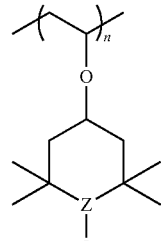

(n is 5 to 1000)

[chemical formula 7]

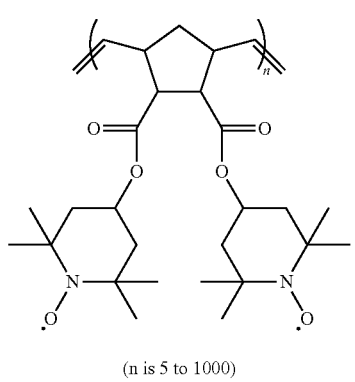

(n is 5 to 1000)

Specific examples of the polymers with sulfonyloxy radicals include PSS of chemical formula 8, poly(4-styrenesulfonate).

[chemical formula 8]

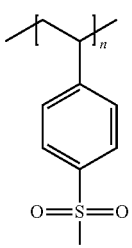

(n is 5 to 1000)

Specific examples of the polymers with phenoxyl radicals include a substance containing a phenoxyl group of chemical formula 9, a substance containing a tetrametyhylphenoxyl group of chemical formula 10. The polymers with phenoxyl radicals may have 5 to 1000 repeat units.

[chemical formula 9]

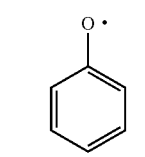

[chemical formula 10]

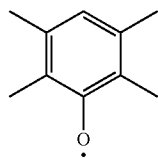

The polymers with nitroxide radicals and the polymers with phenoxyl radicals may be used for both a positive electrode and a negative electrode. The polymers with sulfonyloxy radicals may be used for a negative electrode.

When the polymers with nitroxide radicals are used for a positive electrode, the nitroxide radicals lose electrons during charging and become oxoammonium cations, and the oxoammonium cations acquire electrons during discharging and become the nitroxide radicals according to the reaction shown in chemical formula 11 below.

[chemical formula 11]

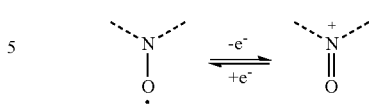

When the polymers with nitroxide radicals are used for a negative electrode, the nitroxide radicals acquire electrons during charging and become aminoxyl anions, and the aminoxyl anions lose electrons during discharging and become the nitroxide radicals according to the reaction shown in chemical formula 12 below.

[chemical formula 12]

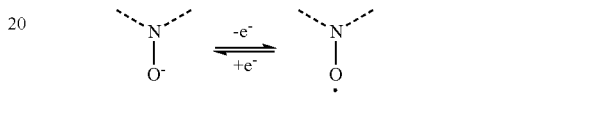

When the polymers with phenoxyl radicals are used for a positive electrode, the phenoxyl radicals lose electrons during charging and become phenoxyl cations, and the phenoxyl cations acquire electrons during discharging and become the phenoxyl radicals according to the reaction shown in chemical formula 13 below.

[chemical formula 13]

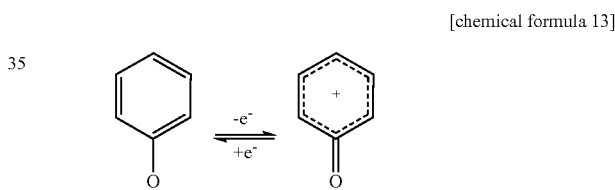

When the polymers with phenoxyl radicals are used for the negative electrode, the phenoxyl radicals acquire electrons during charging and become phenoxyl anions, and the phenoxyl anions lose electrons during discharging and become the phenoxyl radicals according to the reaction shown in chemical formula 14 below.

[chemical formula 14]

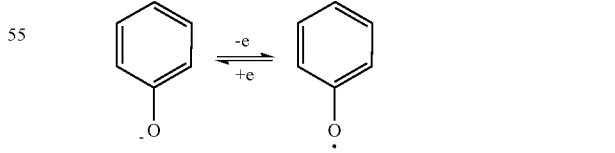

When the polymers with sulfonyloxy radicals are used for a negative electrode, the sulfonyloxy radicals acquire electrons during charging and become sulfonyloxy anions, and the sulfonyloxy anions lose electrons during discharging and become the sulfonyloxy radicals according to the reaction shown in chemical formula 15 below.

[chemical formula 15]

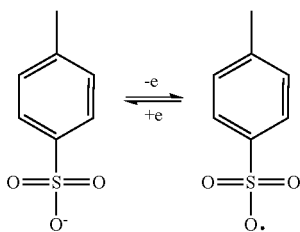

For example, if PTVE polymer additive of chemical formula 6 is used as a polymer additive containing free radicals of the present invention, and NaC104 salt is used as an electrolyte, the reaction as in chemical formula 16 occurs in the positive electrode and the reaction as in chemical formula 17 occurs in the negative electrode.

[chemical formula 16]

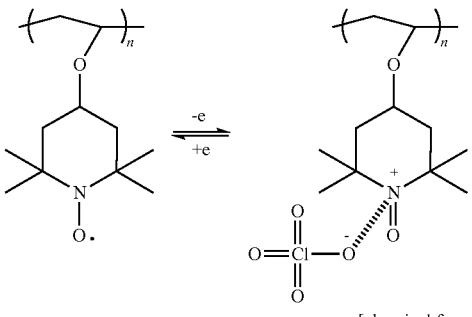

[chemical formula 17]

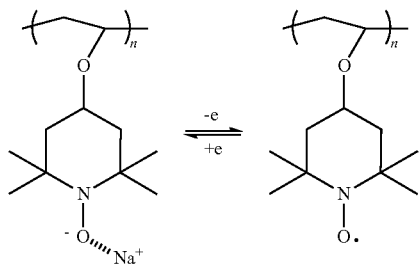

As the positive electrode and negative electrode to which the polymer additive containing free radicals of the present invention is added, a conventional positive electrode and negative electrode may be used. For example, a positive electrode may be made by mixing a positive electrode active material, a conductive material, and a binder and applying the mixture to an aluminum electrode plate. A negative electrode may be made by mixing a negative electrode active material, a conductive material, and a binder and applying the mixture to a copper electrode plate.

The electrode active material may be LCO (lithium cobalt oxide, $LiCoO_2$), NCM (nickel cobalt manganese, Li(NiCoMn)$O_2$), NCA (nickel cobalt aluminum, Li(NiCoAl)$O_2$), LMO (lithium manganese oxide, $LiMn_2O_4$), LFP (lithium iron phosphate, $LiFePO_4$), and the like. More specifically, the electrode active material may be an oxide containing a lithium atom, a sulfur mixture, an oxide containing a sodium atom, a carbon type electrode active material, a lithium metal type electrode active material, a sodium metal type electrode active material, an aluminum metal type electrode active material, a zinc metal type electrode active material, a carbon containing air, and a mixture thereof.

The oxide containing a lithium atom may be $LiMO_2$ (M=Co, Mn, Ni, Fe, etc.), $LiNi_xCo_yMn_{1-x-y}O_2$ (x⇒0.5, y=<0.2) (NCM), $LiNi_{1-x-y}Co_xAl_yO_2$ (x⇒0.5, y=<0.2) (NCA), a layered structure compound, a spinel structure compound, an olivine structure compound, and a mixture thereof.

The oxide containing a sodium atom may be $NaMO_2$ (M=Co, Mn, Ni, Fe, etc.), $NaM_2O_4$ (M=Co, Mn, Ni, Fe, etc.), $NaMPO_4$ (M=Co, Mn, Ni, Fe, etc.), $NaNi_xCo_yMn_{1-x-y}O_2$ (x⇒0.5, y=<0.2) (NCM), $NaNi_{1-x-y}Co_xAl_yO_2$ (x⇒0.5, y=<0.2) (NCA), a layered structure compound, a spinel structure compound, an olivine structure compound, and a mixture thereof.

The sulfur mixture may be S, $FeS_2$, $Li_2S$, $MoS_2$, $CuS_2$, and the like.

The carbon type electrode active material may be graphite, hard carbon, carbon nanotubes, graphene, and the like.

The lithium metal type electrode active material may be Li, and the like.

The sodium metal type electrode active material may be Na, and the like.

The aluminum metal type electrode active material may be Al, and the like.

The zinc metal type electrode active material may be Zn, and the like.

The carbon containing air may be Air-C, $CO_2$—C, and the like.

The negative electrode active material may be carbon, transition metal oxide, silicon oxide, nickel metal, silicon-nickel alloy, and the like.

The conductive material may be carbon black, acetylene black, graphite type conductive material, amorphous carbon type conductive material, crystalline carbon type conductive material, carbon nanofiber type conductive material, vapor grown carbon fiber (VGCF), graphene type conductive material, conductive polymer type conductive material, and a combination thereof.

The binder may be polyvinylidene fluoride (PVdF) type or its copolymer, poly[(vinylidene fluoride co-trifluoroethylene] type or its copolymer, polyethylene glycol (PEO) type or its copolymer, polyacrylic nitrile (PAN) type or its copolymer, poly(methyl methacrylate) (PMMA) type or its copolymer, polyvinyl chloride type or its copolymer, polyvinylpyrrolidone (PVP) type or its copolymer, polyimide (PI) type or its copolymer, polyethylene (PE) type or its copolymer, polyurethane (PU) type or its copolymer, polypropylene (PP) type or its copolymer, poly(propylene oxide) (PPO) type or its copolymer, Poly(ethylene imine) (PEI) type or its copolymer, poly(ethylene sulfide) (PES) type or its copolymer, poly(vinyl acetate) (PVAc) type or its copolymer, poly(ethylene succinate) (PESc) type or its copolymer, polyester type or its copolymer, polyamine type or its copolymer, polysulfide type or its copolymer, siloxane type or its copolymer, styrene butadiene rubber (SBR) type or its copolymer, carboxymethylcellulose (CMC) type or its copolymer, a derivative thereof, and a combination thereof.

The electrode active material, the conductive material, and the binder may be mixed using a solvent. The solvent may be DMF (dimethylformamide), NMP (N-methyl-2-pyrrolidone), DMAc (N,N-dimethylacetamide), acetone, ethanol, methanol, butanol, distilled water, PC (propylene carbonate), DMC (dimethyl carbonate), VC (vinylene carbonate), DME (1,2-dimethoxyethane), THF (tetrahydrofuran), hexanol, chloroform, DMSO (dimethyl sulfoxide), DEC (diethyl carbonate), a derivative thereof, and a combination thereof.

The organic polymer electrode additive of the present invention may be used in an amount of 45% by weight to 0.5% by weight based on 45% by weight to 99% by weight of the electrode active material, and the conductive material and the binder may be used for the remainder. A small amount of the binder may or may not be added. The organic polymer electrode additive of the present invention may be more preferably used in an amount of 19.5% by weight to 2% by weight based on 80% by weight to 95% by weight of the electrode active material, and the conductive material and the binder may be used for the remainder. A small amount of the binder may or may not be added.

The organic polymer electrode additive of the present invention may function as a binder by increasing the viscosity when dissolved in a solvent. The organic polymer electrode additive of the present invention may have a viscosity ranging from 3 cP to 50 cP when dissolved in a solvent. It may be more preferable that the organic polymer electrode additive of the present invention has a viscosity in the range of 5 cP to 30 cP when dissolved in a solvent.

The structure of the electrode according to the present invention is shown in FIG. 1. After mixing the organic polymer electrode additive of the present invention together with the electrode active material, the conductive material, and the binder, the mixture is applied to an electrode plate to form an electrode.

EXAMPLE A secondary battery in which the additive of the present invention was included in the electrode was configured as an example, and a secondary battery in which the additive of the present invention was not included in the electrode was configured as a comparative example.

Example 1 and Comparative Example 1

The positive electrode of Example 1 was composed of 85% by weight of $LiMn_2O_4$ as LMO electrode material, 5% by weight of PTMA, 3% by weight of PVdF binder, and 7% by weight of SUPER-P™ carbon conductive material manufactured by TIMCAL. The positive electrode of Comparative Example 1 was composed of 85% by weight of $LiMn_2O_4$, 8% by weight of PVdF binder, and 7% by weight of SUPER-P™ carbon conductive material manufactured by TIMCAL. In both Example 1 and Comparative Example 1, lithium metal was used as a negative electrode. The secondary batteries of Example 1 and Comparative Example 1 were subjected to a charge-discharge test at a current density of 0.5 C and a current density of 1 C. The results are shown in FIG. 2 and FIG. 3.

Figure 2:
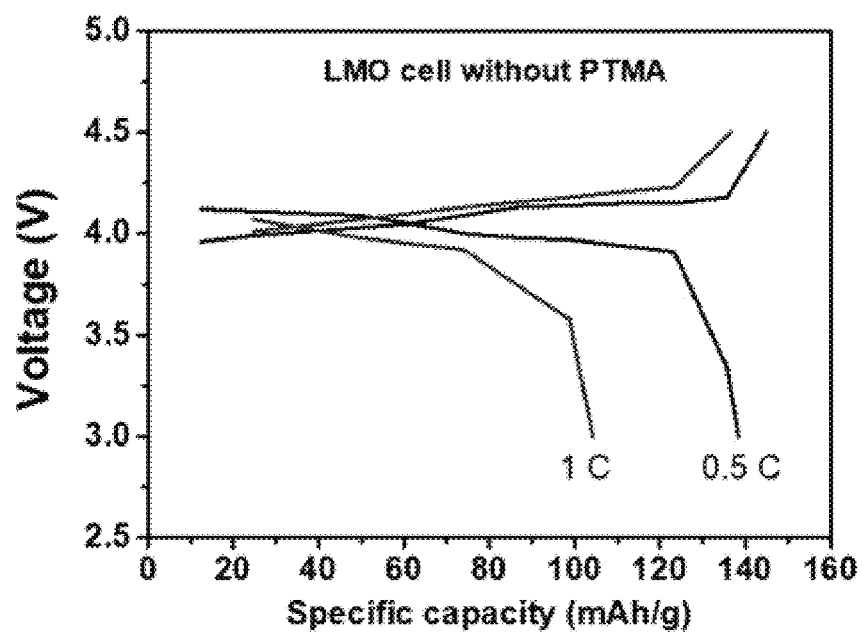
FIG. 2 is a charge-discharge graph of a secondary battery made using a $LiMn_2O_4$ positive electrode without adding PTMA additive at current densities of 0.5 C and 1 C.
Figure 3:
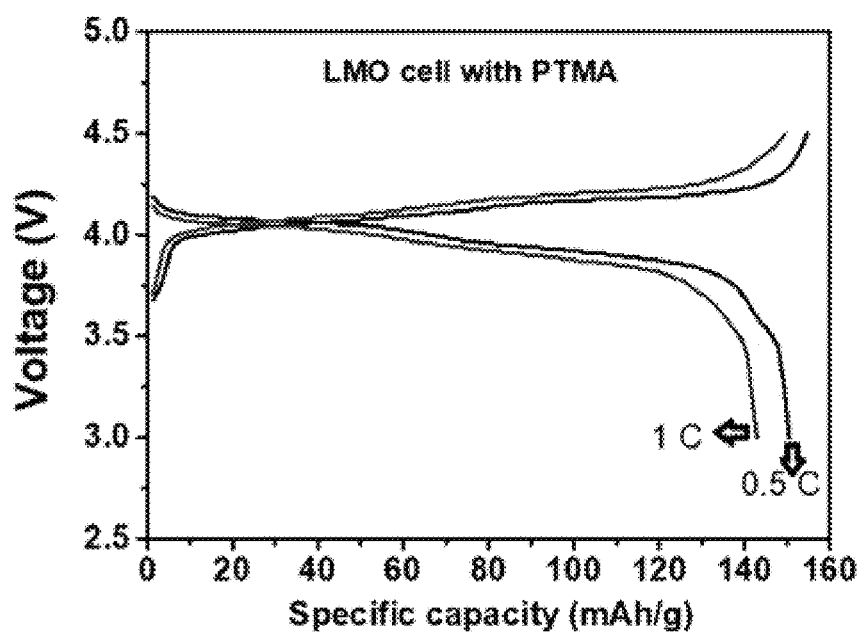
FIG. 3 is a charge-discharge graph of a secondary battery made using a $LiMn_2O_4$ positive electrode with PTMA additive added at current densities of 0.5 C and 1 C.

As shown in FIG. 2 and FIG. 3, the secondary battery using the PTMA organic polymer electrode additive exhibited higher capacity and higher C-rate characteristics than the secondary battery without the PTMA additive. The secondary battery of Example 1 to which PTMA was added maintained a high capacity of 140 mAh/g or more even at a high rate of 1 C, but the secondary battery of Comparative Example 1 to which PTMA was not added exhibited a low capacity of 105 mAh/g.

Example 2 and Comparative Example 2

The positive electrode of Example 2 was composed of 88% by weight of $LiNi_{0.6}Mn_{0.2}Co_{0.2}O_2$ as NCM electrode material, 3% by weight of PTVE, 2% by weight of PVdF binder, and 7% by weight of SUPER-P™ carbon conductive material manufactured by TIMCAL. The positive electrode of Comparative Example 2 was composed of 88% by weight of $LiNi_{0.6}Mn_{0.2}Co_{0.2}O_2$, 5% by weight of PVdF binder, and 7% by weight of SUPER-P™ carbon conductive material manufactured by TIMCAL. In both Example 2 and Comparative Example 2, lithium metal was used as a negative electrode. The secondary batteries of Example 2 and Comparative Example 2 were subjected to a charge-discharge test at a current density of 0.5 C. With the secondary batteries of Example 2 and Comparative Example 2, the discharge capacity was measured up to 100 cycles at a current density of 0.5 C. The results are shown in FIG. 4 and FIG. 5.

Figure 4:
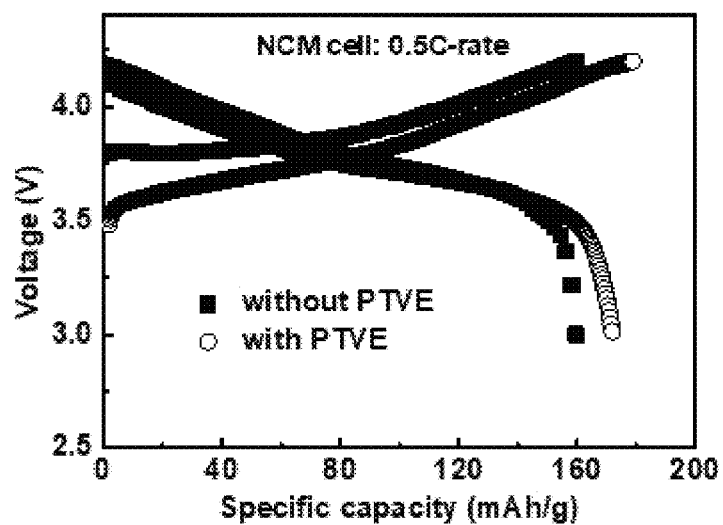
FIG. 4 is a charge-discharge graph of a secondary battery made using a $LiNi_{0.6}Mn_{0.2}Co_{0.2}O_2$ positive electrode with PTVE additive added and a secondary battery made using a $LiNi_{0.6}Mn_{0.2}Co_{0.2}O_2$ positive electrode without PTVE additive added at a current density of 0.5 C.
Figure 5:
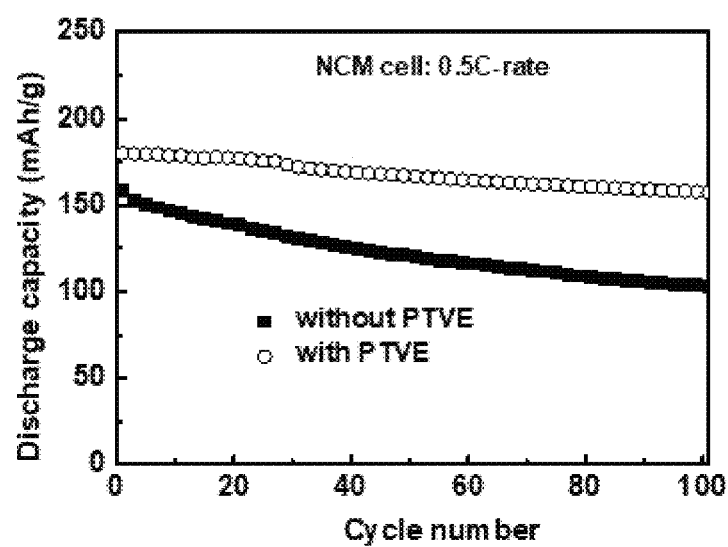
FIG. 5 is a cycle life characteristic graph of a secondary battery made using a $LiNi_{0.6}Mn_{0.2}Co_{0.2}O_2$ positive electrode with PTVE additive added and a secondary battery made using a $LiNi_{0.6}Mn_{0.2}Co_{0.2}O_2$ positive electrode without PTVE additive added at a current density of 0.5 C.

The NCM secondary battery of Example 2 with PTVE added showed a capacity of 180 mAh/g at a current density of 0.5 C, and the NCM secondary battery of Comparative Example 2 without PTVE had a low capacity of 160 mAh/g (see FIG. 4). It can be seen from the cycle life graph of FIG. 5 of the secondary battery that the NCM secondary battery of Example 2 to which PTVE was added has a superior capacity maintenance to that of the NCM secondary battery of Comparative Example 2 to which PTVE was not added up to 100 cycles.

Example 3 and Comparative Example 3

The positive electrode of Example 3 was composed of 80% by weight of $LiNi_{0.5}Mn_{1.5}O_4$ as LNMO(lithium nickel manganese oxide) electrode material, 5% by weight of PTNB, 5% by weight of PVdF binder, and 10% by weight of SUPER-P™ carbon conductive material manufactured by TIMCAL. The positive electrode of Comparative Example 3 was composed of 80% by weight of $LiNi_{0.5}Mn_{1.5}O_4$, 10% by weight of PVdF binder, and 10% by weight of SUPER-P™ carbon conductive material manufactured by TIMCAL. In both Example 3 and Comparative Example 3, lithium metal was used as a negative electrode. The secondary batteries of Example 3 and Comparative Example 3 were subjected to a charge-discharge test at a current density of 0.5 C. With the secondary batteries of Example 3 and Comparative Example 3, the discharge capacity was measured up to 100 cycles at a current density of 0.5 C. The results are shown in FIG. 6 and FIG. 7.

Figure 6:
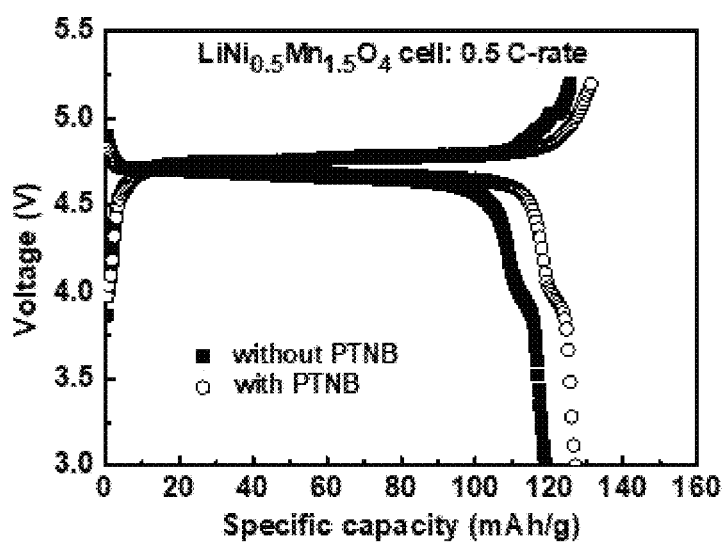
FIG. 6 is a charge-discharge graph of a secondary battery made using a LiNi$_{0.5}$Mn$_{1.5}$O$_4$ positive electrode with PTNB additive added and a secondary battery made using a LiNi$_{0.5}$Mn$_{1.5}$O$_4$ positive electrode without PTNB additive added at a current density of 0.5 C.
Figure 7:
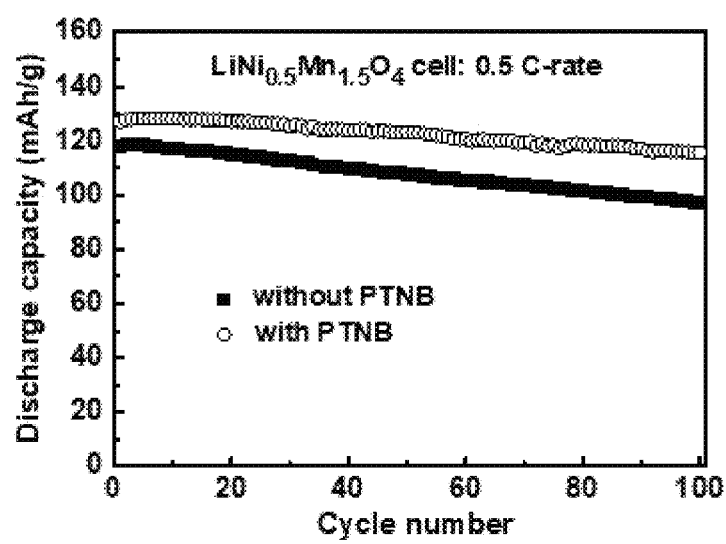
FIG. 7 is a cycle life characteristic graph of a secondary battery made using a LiNi$_{0.5}$Mn$_{1.5}$O$_4$ positive electrode with PTNB additive added and a secondary battery made using a LiNi$_{0.5}$Mn$_{1.5}$O$_4$ positive electrode without PTNB additive added at a current density of 0.5 C.

The LMNO secondary battery of Example 3 to which PTNB was added showed a capacity of 127 mAh/g at a current density of 0.5 C, but the LMNO secondary battery of Comparative Example 3 to which PTNB was not added showed a low capacity of 119mAh/g (see FIG. 6). The LMNO secondary battery of Example 3 to which PTNB was added exhibited a higher cycle life characteristics and a higher capacity maintenance than the LMNO secondary battery of Comparative Example 3 to which PTNB was not added in the evaluation of cycle life characteristics up to 100 cycles (see FIG. 7).

Example 4 and Comparative Example 4

Figure 8:
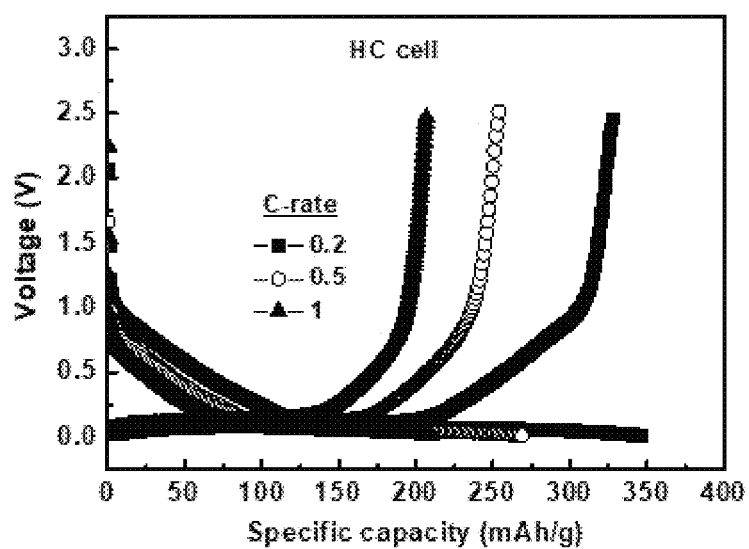
FIG. 8 is a charge-discharge graph according to the current density of a half secondary battery made using a hard carbon negative electrode without adding PSS additive.
Figure 9:
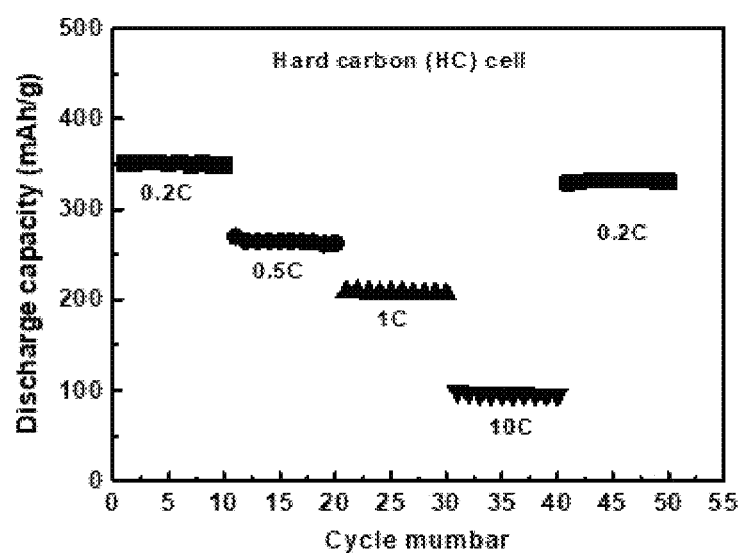
FIG. 9 is a C-rate characteristic graph according to the current density of a half secondary battery made using a hard carbon negative electrode without adding PSS additive.
Figure 10:
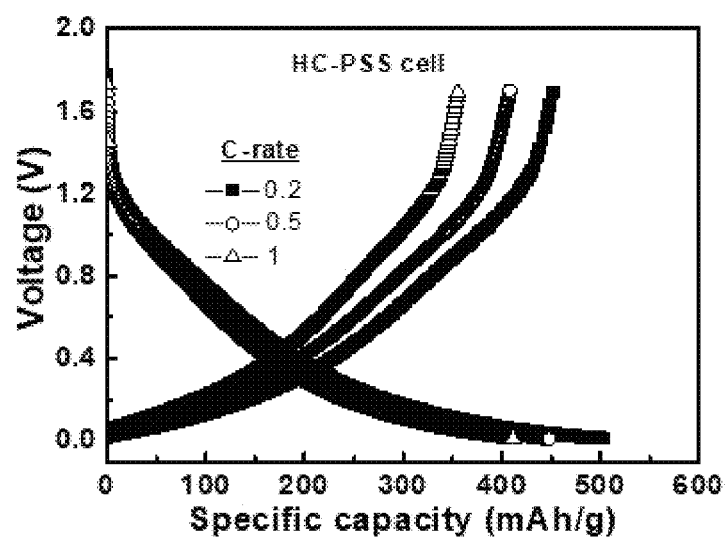
FIG. 10 is a charge-discharge graph according to the current density of a half secondary battery made using a hard carbon negative electrode with adding PSS additive.
Figure 11:
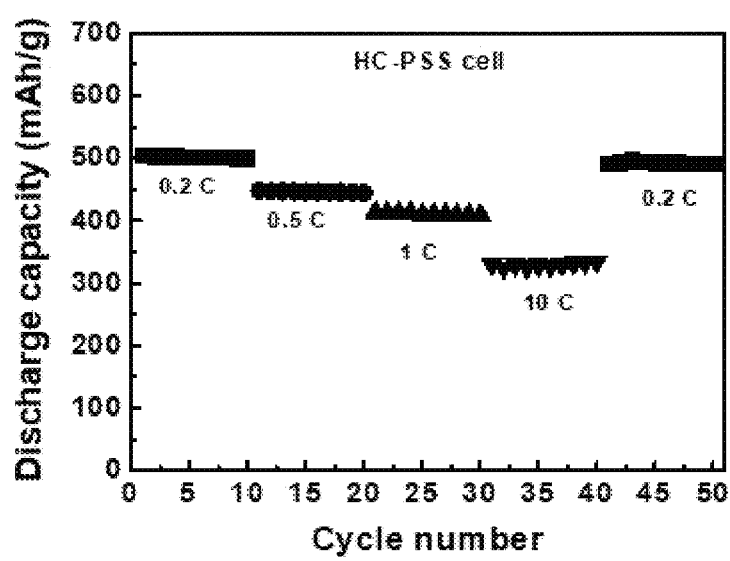
FIG. 11 is a C-rate characteristic graph according to the current density of a half secondary battery made using a hard carbon negative electrode with adding PSS additive.

The negative electrode of Example 4 was composed of 46% by weight of hard carbon as a carbon type electrode material, 46% by weight of PSS, 4% by weight of PVdF binder, and 4% by weight of SUPER-P™ carbon conductive material manufactured by TIMCAL. The negative electrode of Comparative Example 4 was composed of 92% by weight of hard carbon, 4% by weight of PVdF binder, and 4% by weight of SUPER-P™ carbon conductive material manufactured by TIMCAL. In both Example 4 and Comparative Example 4, sodium metal was used as the reference electrode of the half cell. Charge-discharge tests were performed at current densities of 0.2 C, 0.5 C, and 1 C with the secondary batteries of Example 4 and Comparative Example 4 (see FIG. 8 and FIG. 10). Discharge capacity was measured up to 50 cycles at current densities of 0.2 C, 0.5 C, 1 C, and 10 C with the secondary batteries of Example 4 and Comparative Example 4 (see FIG. 9 and FIG. 11). FIG. 8 and FIG. 10 are charge-discharge graphs of the secondary battery of Comparative Example 4 to which PSS was not added and the secondary battery of Example 4 to which PSS was added. FIG. 9 and FIG. 11 are C-rate characteristic graphs showing the capacity change according to the discharge current density of the secondary battery of Comparative Example 4 to which PSS was not added and the secondary battery of Example 4 to which PSS was added.

As shown in FIG. 8 and FIG. 10, the secondary battery of Example 4 to which PSS was added exhibited higher capacity than the secondary battery of Comparative Example 4 to which PSS was not added at a current densities of all 0.2 C, 0.5 C, and 1 C. As shown in FIG. 9, the secondary battery of Comparative Example 4 to which PSS was not added showed a capacity of 350 mAh/g at a current density of 0.2 C, and as the current density increased to 10 C, the capacity rapidly decreased to less than 100 mAh/g. As shown in FIG. 11, however, the secondary battery to which PSS was added showed a high capacity of 500 mAh/g at a current density of 0.2 C, and a high capacity of 300 mAh/g even at a high discharge current density of 10 C. From this, it can be seen that the fast charging and fast discharging characteristics are improved when the additive of the present invention is added.

Referring to FIG. 9, since the secondary battery of Comparative Example 4 to which PSS was not added showed a capacity of 209 mAh/g at 1 C, it took 1 hour to charge with a capacity of 209 mAh/g. Since it showed a capacity of 99 mAh/g at 10 C, it took 6 minutes to charge with a capacity of 99 mAh/g. That is, about half of the 1 C capacity was charged over 6 minutes. On the other hand, since the secondary battery of Example 4 to which PSS was added showed a capacity of 405 mAh/g at 1 C, it took 1 hour to charge with a capacity of 405 mAh/g. Since it showed a capacity of 300 mAh/g at 10 C, it took 6 minutes to charge with a capacity of 300 mAh/g. That is, about ¾ of the 1 C capacity was charged over 6 minutes. From this, it can be seen that the secondary battery can be rapidly charged by adding the additive of the present invention.

As shown in FIG. 9, when the current density of the secondary battery of Comparative Example 4 to which PSS was not added was lowered to 0.2 C again after 10 C, the capacity was 329 mAh/g, which was lower than the capacity at the first 0.2 C. As shown in FIG. 11, however, when the current density of the secondary battery to which PSS was added was lowered to 0.2 C again after 10 C, the capacity was 491 mAh/g, which was little different from the capacity at the first 0.2 C. From this, it can be seen that when the additive of the present invention is added, the characteristics of the secondary battery are maintained even when fast charging and fast discharging is performed.

Figure 12:
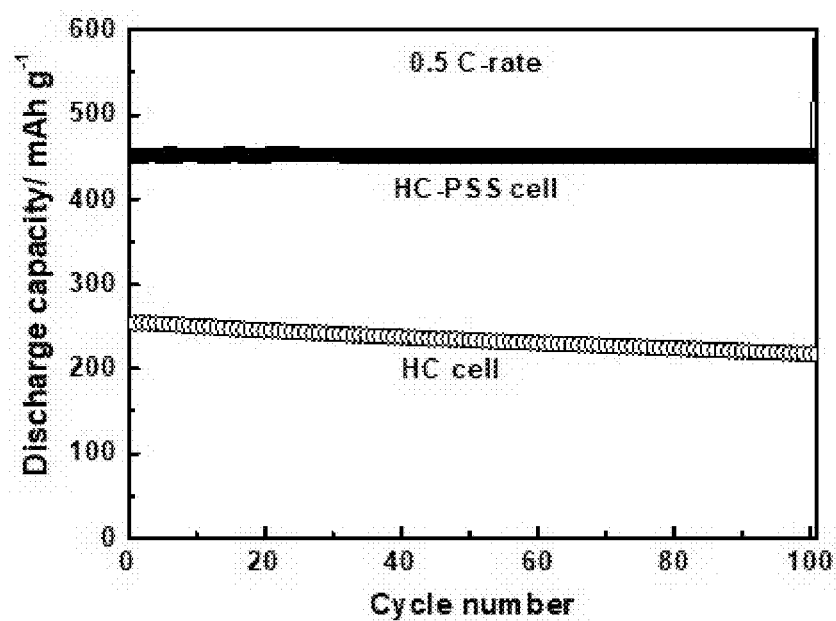
FIG. 12 is a cycle life characteristic graph of a half secondary battery made using a hard carbon negative electrode with PSS additive added and a half secondary battery made using a hard carbon negative electrode without PSS additive added at a current density of 0.5 C.

The secondary battery of Example 4 to which PSS was added and the secondary battery of Comparative Example 4 to PSS was not added were charged and discharged at 0.5 C for up to 100 cycles, and each discharge capacity was measured (see FIG. 12). As shown in FIG. 12, the secondary battery of Example 4 to which PSS was added had a capacity of 452 mAh/g in 1 cycle, and the capacity was 451 mAh/g even after 100 cycles, so the capacity reduction was only 0.2%. However, the secondary battery of Comparative Example 4 to which PSS was not added had a capacity of 254 mAh/g in 1 cycle, and the capacity was 217 mAh/g after 100 cycles, so the capacity reduction was 15%. From this, it can be seen that the addition of the additive of the present invention improves the capacity maintenance, that is, the cycle life characteristics of a secondary battery.

Example 5 and Comparative Example 5

Figure 13:
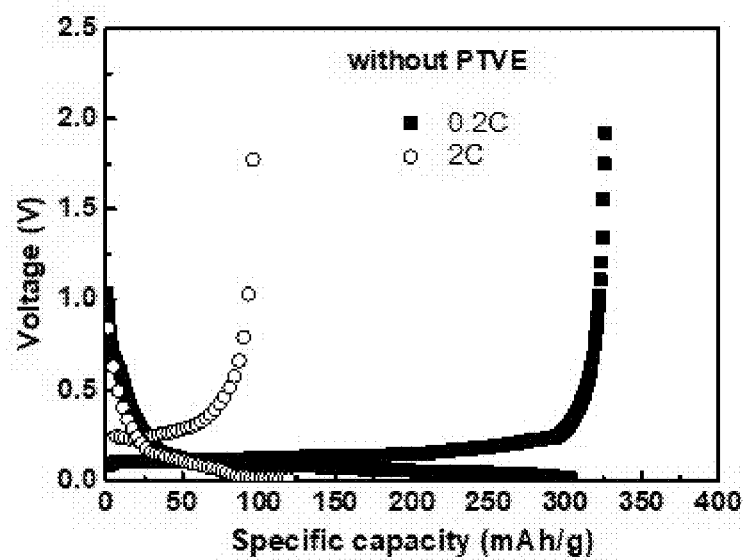
FIG. 13 is a charge-discharge graph according to the current density of a secondary battery made using a graphite negative electrode without PTVE additive added.
Figure 14:
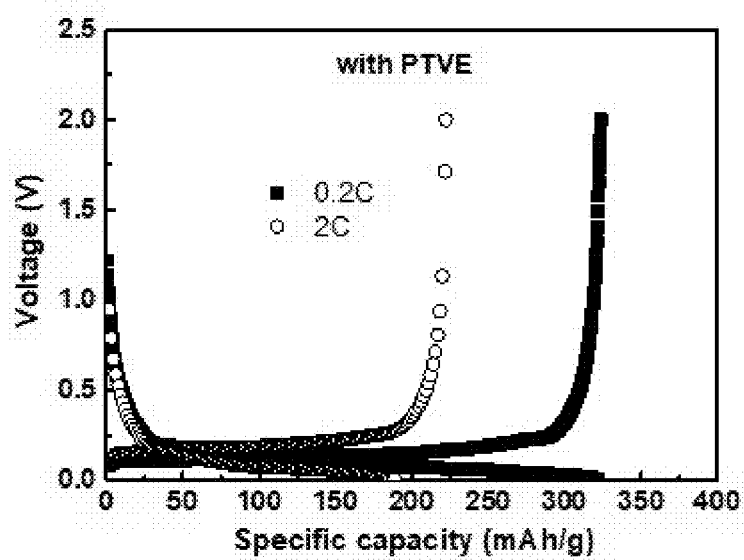
FIG. 14 is a charge-discharge graph according to the current density of a secondary battery made using a graphite negative electrode with PTVE additive added.

The negative electrode of Example 5 was composed of 80% by weight of hard carbon as a carbon type electrode material, 5% by weight of PTVE, 5% by weight of PVdF binder, and 10% by weight of SUPER-P™ carbon conductive material manufactured by TIMCAL. The negative electrode of Comparative Example 5 was composed of 80% by weight of hard carbon, 10% by weight of PVdF binder, and 10% by weight of SUPER-P™ carbon conductive material manufactured by TIMCAL. In both Example 5 and Comparative Example 5, lithium metal was used as the reference electrode of the half cell. Charge-discharge tests were performed at current densities of 0.2 C and 2 C with the secondary batteries of Example 5 and Comparative Example 5 (see FIG. 13 and FIG. 14). The secondary battery of Comparative Example 5 using the graphite negative electrode to which PTVE was not added showed a discharge capacity of 303 mAh/g at 0.2 C, but at a high current density of 2 C, the discharge capacity rapidly decreased to 120 mAh/g (see FIG. 13). However, the secondary battery of Example 5 using the graphite negative electrode to which PTVE was added showed a high discharge capacity of 324 mAh/g at 0.2 C, and maintained a high discharge capacity of 222 mAh/g even at a high current density of 2 C (see FIG. 14).

As shown in Examples and Comparative Examples, when the organic polymer additive containing free radicals of the present invention is added to the positive or negative electrode, the electrochemical properties of the secondary battery are improved. The reason for this is that the polymer additive has free radicals and can transfer charges quickly. In addition, this is because the stability of the electrode active material is improved by coating a part of the electrode active material with the stable polymer additive. In addition, since the polymer additive of the present invention can accept or release electrons, it participates in the electrochemical reaction of the secondary battery and increases the capacity of the secondary battery.

What is claimed is:

1. An electrode for a secondary battery comprising:
   an inorganic electrode active material,
   a binder,
   a conductive material, and
   an organic polymer additive that contains a free radical in the molecular structure and can accept or release electrons through an electrochemical oxidation-reduction reaction,
   when the entire electrode is 100% by weight, the conductive material is included in an amount of 4% by weight to 10% by weight of the electrode.

2. An electrode for a secondary battery comprising:
   an inorganic electrode active material,
   a binder,
   a conductive material, and
   an organic polymer additive that contains a structure in which a free radical is attached next to an oxygen atom in the molecular structure and can accept or release electrons through an electrochemical oxidation-reduction reaction, when the entire electrode is 100% by weight, the conductive material is included in an amount of 4% by weight to 10% by weight of the electrode.

3. The electrode for a secondary battery according to claim 2, wherein the organic polymer additive contains a nitroxide radical.

4. The electrode for a secondary battery according to claim 2, wherein the organic polymer additive contains a sulfonyloxy radical.

5. The electrode for a secondary battery according to claim 2, wherein the organic polymer additive contains a phenoxyl radical.

6. The electrode for a secondary battery according to claim 1, wherein the organic polymer additive is dissolved in a solvent and exhibits viscosity, so that it can serve as a binder.

7. The electrode for a secondary battery according to claim 1, wherein when the entire electrode is 100% by weight, the electrode active material is included in an amount of 45% by weight to 99% by weight, and the organic polymer additive is included in an amount of 45% by weight to 0.5% by weight.

8. The electrode for a secondary battery according to claim 7, wherein when the entire electrode is 100% by weight, the electrode active material is included in an amount of 80% by weight to 95% by weight, and the organic polymer additive is included in an amount of 19.5% by weight to 2% by weight.

9. The electrode for a secondary battery according to claim 1, wherein the electrode active material is selected from a group consisting of an oxide containing a lithium atom, a sulfur mixture, an oxide containing a sodium atom, a carbon type electrode active material, a lithium metal type electrode active material, a sodium metal type electrode active material, an aluminum metal type electrode active material, a zinc metal type electrode active material, a carbon containing air, and a mixture thereof.

10. The electrode for a secondary battery according to claim 9, wherein the oxide containing a lithium atom is selected from a group consisting of $LiMO_2$ (M=Co, Mn, Ni, Fe), $LiNi_xCo_yMn_{1-x-y}O_2$ (x$\Rightarrow$0.5, y=<0.2) (NCM), $LiNi_{1-x-y}Co_xAl_yO_2$ (x$\Rightarrow$0.5, y=<0.2) (NCA), a layered structure compound, a spinel structure compound, an olivine structure compound, and a mixture thereof, and the oxide containing a sodium atom is selected from a group consists of $NaMO_2$ (M=Co, Mn, Ni, Fe), $NaM_2O_4$ (M=Co, Mn, Ni, or Fe), $NaMPO_4$ (M=Co, Mn, Ni, Fe), $NaNi_xCo_yMn_{1-x-y}O_2$ (x$\Rightarrow$0.5, y=<0.2) (NCM), $NaNi_{1-x-y}Co_xAl_yO_2$ (x$\Rightarrow$0.5, y=<0.2) (NCA), a layered structure compound, a spinel structure compound, an olivine structure compound, and a mixture thereof.

11. A secondary battery comprising the electrode for a secondary battery according to claim 1.

\* \* \* \* \*